US008874755B1

(12) United States Patent
Deklich et al.

(10) Patent No.: US 8,874,755 B1
(45) Date of Patent: Oct. 28, 2014

(54) PROVISIONING OF CLOUD NETWORKS WITH SERVICES

(71) Applicant: Splunk Inc., San Francisco, CA (US)

(72) Inventors: Dejan Deklich, Redwood City, CA (US); Ledio Ago, Oakland, CA (US); Richard Braun, San Francisco, CA (US)

(73) Assignee: Splunk, Inc., San Francisco, CA (US)

( * ) Notice: Subject to any disclaimer, the term of this patent is extended or adjusted under 35 U.S.C. 154(b) by 0 days.

(21) Appl. No.: 13/956,030

(22) Filed: Jul. 31, 2013

(51) Int. Cl.
G06F 15/173 (2006.01)
G06F 15/177 (2006.01)

(52) U.S. Cl.
CPC .................................. G06F 15/177 (2013.01)
USPC ........... 709/226; 709/220; 709/221; 709/222; 709/225

(58) Field of Classification Search
USPC .......................... 709/220, 221, 222, 225, 226
See application file for complete search history.

(56) References Cited

U.S. PATENT DOCUMENTS

| 2012/0272237 | A1* | 10/2012 | Baron | 718/1 |
| 2013/0067345 | A1* | 3/2013 | Das et al. | 715/740 |
| 2013/0132461 | A1* | 5/2013 | Patel | 709/202 |
| 2013/0246625 | A1* | 9/2013 | Vendrow | 709/226 |
| 2013/0339510 | A1* | 12/2013 | Douglas et al. | 709/223 |
| 2014/0052768 | A1* | 2/2014 | Deng et al. | 709/201 |
| 2014/0052773 | A1* | 2/2014 | Deng et al. | 709/203 |

OTHER PUBLICATIONS

John Ferguson Smart, "Jenkins and Hudson: Butler Wars!", Feb. 16, 2011, p. 1.*
Kohsuke Kawaguchi, "Meet Jenkins", Sep. 9, 2013, pp. 1-3.*

* cited by examiner

*Primary Examiner* — Tammy Nguyen
*Assistant Examiner* — Jonathan Bui
(74) *Attorney, Agent, or Firm* — Haynes Beffel & Wolfeld LLP; Ernest J. Beffel, Jr.

(57) ABSTRACT

Systems and methods are provided for provisioning a hosted computing environment in accordance with customer requirements relating to a service. In some embodiments, a computer-implemented method is provided. The method includes generating a graphical interface on a computing device and receiving input corresponding to an indication of one or more requirements, wherein the input is received using the graphical interface, and wherein the one or more requirements correspond to a hosted computing environment. The method further comprises converting each indication of the one or more requirements into one or more entries of a provisioning template, wherein the provisioning template includes multiple entries, and wherein the provisioning template is associated with the hosted computing environment. The method further comprises providing the provisioning template to a provisioning program to provision the hosted computing environment.

30 Claims, 10 Drawing Sheets

```
{
    :name => 'CUSTOMER_NAME',
    :chef_type => 'environment',
    :default_attributes => {
      :stackid => 'stack1',
      :customer_name => 'Whisper Team',
      :domain_suffix => 'splunkwhisper.com',
      :repo_hostname => 'somerepo.splunkwhisper.com',
      :zabbix_hostname => [ 'zabbix1.splunkwhisper.com', 'zabbix2.splunkwhisper.com' ],
      :ssh_keypair => 'infra_whisper',
      :cloud_vendor => {
          :name => 'aws',
          :account => 'splunk-whisper-prod'
      },
      :dns_vendor => {
          :name => 'dynect',
          :account => 'splunk'
      },
      :aws_type => 'm1.large',
      :sac => {
          :mgmt_port => 8089,
          :licenser => {
              :license => 'license_dev',
              :lb_hostname => 'lb-licensemaster.stack1.splunkwhisper.com',
              :primary_hostname => 'licensemaster.stack1.splunkwhisper.com',
              :standby_hostname => 'licensestandby.stack1.splunkwhisper.com'
          },
          :search_head => {
              :lb_hostname => 'lb-searchhead.stack1.splunkwhisper.com',
              :primary_hostname => 'searchmaster.stack1.splunkwhisper.com',
              :standby_hostname => 'searchstandby.stack1.splunkwhisper.com',
              :parameters => {
                  :distributedSearch => {
                      :receiveTimeout => 30
                  }
              }
          },
          :clusters => {
              :replication_factor => 3,
              :search_factor => 3,
              :cluster_0 => {
                  :master_hostname => 'cluster0-master.stack1.splunkwhisper.com',
                  :cluster_id => 0
              },
              :cluster_1 => {
                  :master_hostname => 'cluster1-master.stack1.splunkwhisper.com',
                  :cluster_id => 1
              }
          },
          :indexers => {
              :s2s_port => 9997,
              :replication_port => 9887
          },
          :indexes => {
              :log4jdata => {
                  :maxDataSize => 'auto_high_volume',
                  :maxHotIdleSecs => 86400,
                  :maxHotBuckets => 10,
                  :maxTotalDataSizeMB => 10000000,
                  :maxConcurrentOptimizes => 6,
                  :maxMemMB => 20,
                  :homePath => "$SPLUNK_DB/hot/log4jdata/db",
                  :coldPath => "$SPLUNK_DB/cold/log4jdata/colddb",
                  :thawedPath => "$SPLUNK_DB/cold/log4jdata/thaweddb"
              },
              :syslog => {
                  :maxDataSize => 'auto_high_volume',
                  :maxHotIdleSecs => 86400,
                  :maxHotBuckets => 3,
                  :maxTotalDataSizeMB => 10000000,
                  :maxConcurrentOptimizes => 6,
                  :maxMemMB => 20,
                  :homePath => "$SPLUNK_DB/hot/syslog/db",
                  :coldPath => "$SPLUNK_DB/cold/syslog/colddb",
                  :thawedPath => "$SPLUNK_DB/cold/syslog/thaweddb"
              }
          }
      },
      :cookbook_versions => {
        :splunk => '2.0.0',
        # etc...
      }
    }
}
```

FIG. 10

PROVISIONING OF CLOUD NETWORKS WITH SERVICES

TECHNICAL FIELD

The present disclosure relates generally to computer-implemented systems and methods for provisioning public or private cloud networks and services.

BACKGROUND

Provisioning of a network involves the preparation and setup of various network components in accordance with a service provided to a customer from a service provider. The commands used to provision a network are complex and require technical knowledge of an underlying programming language. A user that is aware of the type of services they desire may be uninformed as to the technical requirements that are needed to provision the network to perform these services. As a result, the user is faced with a problem of how to create the configuration files needed to provision the network.

SUMMARY

The systems and methods of the present disclosure have several features, no single one of which is solely responsible for the desirable attributes described herein. Without limiting the scope of this application as expressed by the claims which follow, some prominent features will now be described herein. After considering this discussion, and particularly after reading the section entitled "Detailed Description of Certain Inventive Embodiments," one will understand how the features of this invention provide several advantages over existing network provisioning systems and methods.

In accordance with the teachings provided herein, systems and methods for provisioning a hosted computing environment in accordance with customer requirements relating to a service are provided. In some embodiments, a computer-implemented method is provided. The method comprises generating a graphical interface on a computing device and receiving input corresponding to an indication of one or more requirements, wherein the input is received using the graphical interface, and wherein the one or more requirements correspond to a hosted computing environment. The method further comprises converting each indication of the one or more requirements into one or more entries of a provisioning template, wherein the provisioning template includes multiple entries, and wherein the provisioning template is associated with the hosted computing environment. The method further comprises providing the provisioning template to a provisioning program to provision the hosted computing environment.

In some embodiments, a system is provided. The system comprises one or more data processors and a non-transitory computer-readable storage medium containing instructions which when executed on the one or more data processors, cause the one or more processors to perform operations including generating a graphical interface on a computing device and receiving input corresponding to an indication of one or more requirements, wherein the input is received using the graphical interface, and wherein the one or more requirements correspond to a hosted computing environment. The one or more operations further include converting each indication of the one or more requirements into one or more entries of a provisioning template, wherein the provisioning template includes multiple entries, and wherein the provisioning template is associated with the hosted computing environment. The one or more operations further include providing the provisioning template to a provisioning program to provision the hosted computing environment.

In some embodiments, a computer-program product tangibly embodied in a non-transitory machine-readable storage medium is provided. The computer-program product includes instructions configured to cause one or more data processors to generate a graphical interface on a computing device and receive input corresponding to an indication of one or more requirements, wherein the input is received using the graphical interface, and wherein the one or more requirements correspond to a hosted computing environment. The computer-program product further includes instructions configured to cause one or more data processors to convert each indication of the one or more requirements into one or more entries of a provisioning template, wherein the provisioning template includes multiple entries, and wherein the provisioning template is associated with the hosted computing environment. The computer-program product further includes instructions configured to cause one or more data processors to provide the provisioning template to a provisioning program to provision the hosted computing environment.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The present disclosure is described in conjunction with the appended figures:

FIG. 10 shows an exemplary embodiment of a provisioning template.

Like reference numbers and designations in the various drawings indicate like elements.

DETAILED DESCRIPTION

Figure 1:
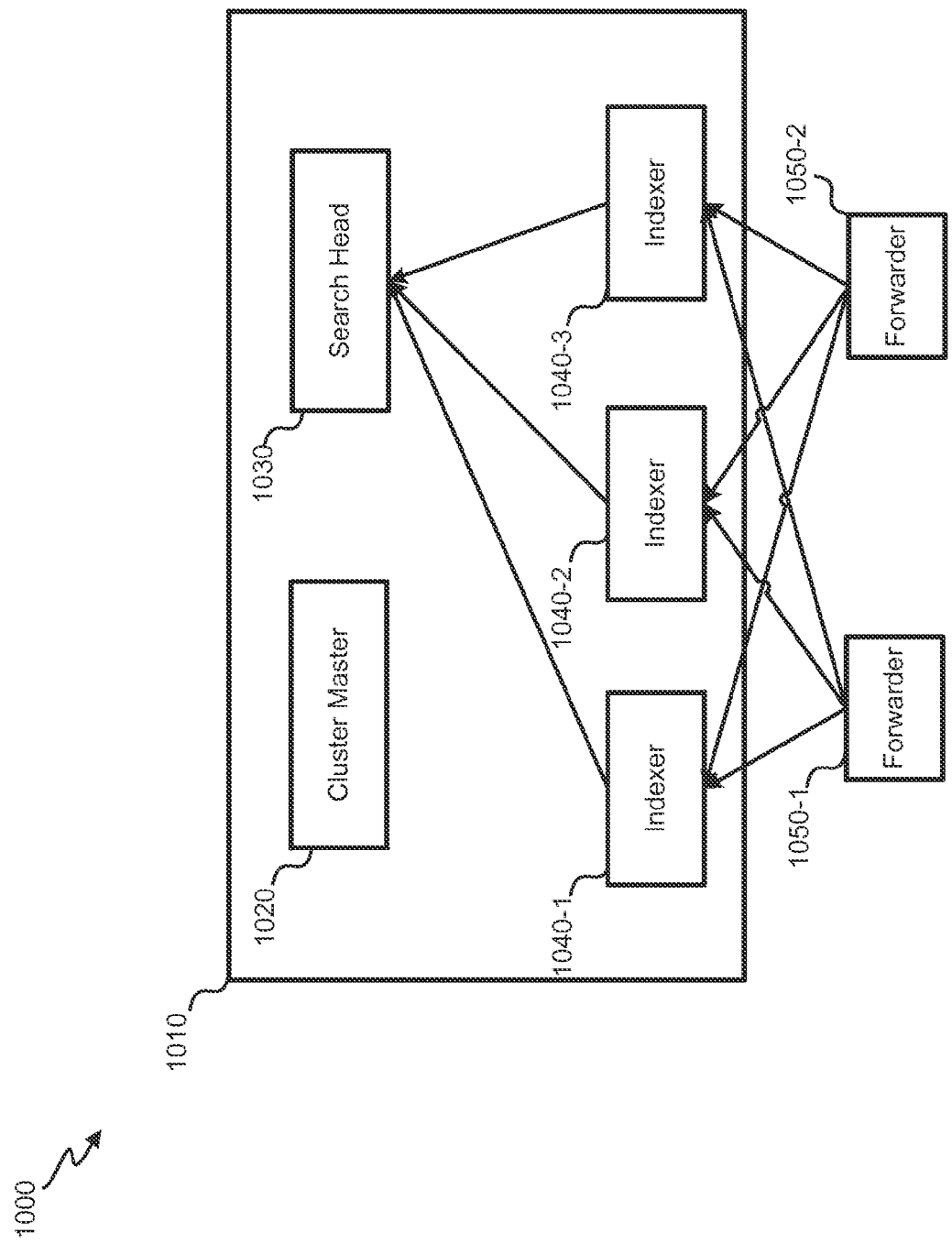
FIG. 1 shows a block diagram of an embodiment of a system for providing indexing, storing, and searching of data.

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

As used herein, the singular forms "a", "an", and "the" include both singular and plural referents unless the context clearly dictates otherwise.

The terms "comprising," "comprises" and "comprised of" as used herein are synonymous with "including," "includes" or "containing," "contains," and are inclusive or open-ended and do not exclude additional, non-recited members, elements or method steps. The terms "comprising," "comprises," and "comprised of" when referring to recite components, elements or method steps also include embodiments which "consist of" said recited components, elements or method steps.

Furthermore, the terms first, second, third and the like in the description and in the claims, are used for distinguishing between two or more elements and not necessarily for describing a quantity or a sequential or chronological order, unless specified. It is to be understood that the terms so used are interchangeable under appropriate circumstances and that the embodiments of the invention described herein are capable of operation in other sequences than described or illustrated herein. Thus, a reference to first and second elements, for example, does not necessarily mean that only two elements may be employed or that the first element must precede the second element in some manner. Also, unless stated otherwise, a set of elements may comprise one or more elements.

Reference throughout this specification to "one embodiment," "an embodiment," "some aspects," "an aspect," or "one aspect" means that a particular feature, structure or characteristic described in connection with the embodiment or aspect is included in at least one embodiment of the present invention. Thus, appearances of the phrases "in one embodiment," "in an embodiment," "some aspects," "an aspect," or "one aspect" in various places throughout this specification are not necessarily all referring to the same embodiment or aspects, but may. Furthermore, the particular features, structures or characteristics may be combined in any suitable manner, as would be apparent to a person skilled in the art from this disclosure, in one or more embodiments or aspects. Furthermore, while some embodiments or aspects described herein include some but not other features included in other embodiments or aspects, combinations of features of different embodiments or aspects are meant to be within the scope of the invention, and form different embodiments or aspects, as would be understood by those in the art. For example, in the appended claims, any of the features of the claimed embodiments or aspects can be used in any combination.

A cloud computing network is an example of a hosted computing environment. Cloud network resources may be shared by multiple users or customers and may also be dynamically re-allocated as the demand from different users changes. Accordingly, cloud computing allows sharing of network resources and services, provides consistency of service, and achieves economies of scale over a network.

Clients or customers may obtain services from service providers that run on a hosted computing environment. In order for the client or customer to have the desired service operate on the hosted computing environment, the hosted computing environment must be provisioned so that the various components of the environment are configured for network operation using the service. Provisioning of a hosted computing environment involves the preparation and setup of the various network components in accordance with the desired service. The commands used to provision the network are complex and require technical knowledge of an underlying programming language. Accordingly, systems and methods are needed to provide users with the ability to provision a hosted computing environment, without requiring the users to have any technical knowledge relating to the commands required to configure the environment.

In some embodiments, an exemplary client, customer, or other user may include a company that desires a service that allows the client's data to be collected, analyzed, and secured into a data store. The customer may use a service from a service provider that collects its data, indexes the data, and allows the customer to search the data. The service may also provide reporting and statistical analysis of the data for the customer. In some embodiments, the data may be machine data. As used herein, the term "machine data" may include data generated by machines of a customer. Examples of machine data include server logs, application logs, business process logs, web access logs, web proxy logs, clickstream data, configuration data, data from application programming interfaces (APIs) and message queues, change events, the output of diagnostic commands and call detail records, sensor data from remote equipment, message queues, and the like. In some embodiments, machine data streams may be segmented into events and time stamped to create time stamped events. In some embodiments, the machine data may be unstructured data, structured data, and/or a combination thereof. As used herein, the term "unstructured data" may refer to data that does not include at least one predefined field. Details relating to machine data, time stamped events, and unstructured data will be described further below with respect to FIGS. 2 and 3.

FIG. 1 illustrates a block diagram of an embodiment of a system 1000 for providing indexing, storing, and searching of data. The system 1000 may collect data from one or more clients or customers, index the data, and allow the clients or customers to search the data. The system 1000 includes a cluster 1010. The cluster 1010 includes a cluster master 1020 that manages the cluster. The cluster 1010 further includes a search head 1030 for coordinating searches across indexers 1040-1, 1040-2, 1040-3. The indexers 1040-1, 1040-2, 1040-3 provide indexing, replication, and searching functions. The system 1000 further includes forwarders 1050-1, 1050-2 that ingest and forward data to the indexers 1040-1, 1040-2, 1040-3.

The search head 1030 receives search queries from clients or customers requesting a search of client data. The search head 1030 coordinates all searches and manages searches across the set of indexers 1040-1, 1040-2, 1040-3. In some embodiments, the cluster master 1020 informs the search head 1030 which indexers are to be used by the search head 1030. The search head 1030 distributes search queries to the indexers 1040-1, 1040-2, 1040-3, and receives search results from each indexer. The search head 1030 then consolidates the results returned by the indexers 1040-1, 1040-2, 1040-3, and returns the consolidated results to the client or customer.

The indexers 1040-1, 1040-2, 1040-3 perform indexing functions for the cluster 1000 by receiving and indexing incoming raw data. In some embodiments, the indexers 1040-1, 1040-2, 1040-3 store the indexed data for searching by a client, customer, or other user. In some embodiments, the indexed data is stored in a separate storage device. In some embodiments, one or more of the indexers 1040-1, 1040-2, 1040-3 may send replicated data to other indexers 1040-1, 1040-2, 1040-3 in the cluster and may receive replicated data from the other indexers. In some embodiments, an indexer 1040-1, 1040-2, or 1040-3 may index received data while simultaneously receiving and sending replicated data to other indexers 1040-1, 1040-2, or 1040-3. In response to search requests received from the search head 1030, indexers 1040-1, 1040-2, 1040-3 may search across their indexed data.

The cluster master 1020 provides management functions for the cluster, including coordinating the replicating activities of the indexers 1040-1, 1040-2, 1040-3. The cluster master 1020 may also inform the search head 1030 where to find data among the indexers 1040-1, 1040-2, 1040-3. In some embodiments, the cluster master 1020 manages the configuration of the indexers 1040-1, 1040-2, 1040-3 and orchestrates remedial activities if an indexer 1040-1, 1040-2, or 1040-3 goes offline or fails. For example, the cluster master 1020 may inform each indexer 1040-1, 1040-2, 1040-3 which of the other indexers 1040-1, 1040-2, or 1040-3 to stream its data to. In some embodiments, after the cluster master 1020 has informed each of the indexers 1040-1, 1040-2, 1040-3 which of the other indexers to stream to, the indexers 1040-1, 1040-2, 1040-3 exchange data with each other without involvement of the cluster master 1020, unless one or more indexers go down. In some embodiments, the cluster master 1020 resides on a different machine or virtual machine than that which the indexers 1040-1, 1040-2, 1040-3 or search head 2030 reside.

Forwarders 1050-1, 1050-2 consume data from external sources and forward the data to an indexer 1040-1, 1040-2, 1040-3. For example, the forwarders 1050-1, 1050-2 may receive data from one or more client or customer machines, and may forward the received data to one or more of the indexers 1040-1, 1040-2, 1040-3.

In some embodiments, the number of indexers that are included in a cluster depends on an indexing load and a cluster replication factor. Indexing load refers to an amount of data that needs to be indexed for a given client or customer. For example, if an indexing load is more than three indexers can handle, more indexers may be added to increase capacity.

As used herein, a "replication factor" is the number of copies of any given data that are to be stored in a cluster. A client or customer may specify the number of copies of data that the client wants the cluster to maintain as part of configuring the cluster master 1020. For example, a client or customer may indicate that they want to store three copies of customer data, which corresponds to a replication factor of three. A replication factor of three requires at least three indexers. The replication factor determines the cluster's failure tolerance, and is also used to determine index replication. A cluster can tolerate a failure of (replication factor −1) indexers 1040-1, 1040-2, 1040-3. For example, if the system 1000 needs to be configured to handle the failure of two of the indexers 1040-1, 1040-2, 1040-3, then a replication factor of three must be configured. A replication factor of three indicates that the cluster 1010 stores three identical copies of a client's data on separate indexers 1040-1, 1040-2, 1040-3. As a result, if two of the indexers 1040-1, 1040-2, or 1040-3 go down or are otherwise inoperable, the data is still available on a third of the indexers 1040-1, 1040-2, or 1040-3.

In some embodiments, if the cluster 1010 is configured with a replication factor of three, one of the indexers 1040-1, 1040-2, 1040-3 may receive data from a forwarder. The indexer may process the data and then stream the data to the two other indexers 1040-1, 1040-2, or 1040-3. Accordingly, the cluster 1010 will contain three complete copies of the data. In some embodiments, all three indexers 1040-1, 1040-2, 1040-3 receive external data from a forwarder 1050-1 or 1050-2 and also receive replicated data from each of the other indexers 1040-1, 1040-2, or 1040-3. In some embodiments, the data stored according to a replication factor is stored as non-searchable copies.

Furthermore, a search factor may be used to determine the number of searchable copies of data that the cluster 1010 maintains. The search factor correlates to how quickly the cluster can recover its searching capability after an indexer goes down. A client or customer may specify the search factor as part of configuring the cluster master 1020. For example, a search factor value of two allows the cluster 1020 to continue searches with little interruption if a single indexer goes down. The difference between a searchable and a non-searchable copy of some data is that the searchable copy contains both the data itself and one or more index files that may be used to search the data. The non-searchable copy contains only the data. In some embodiments, the data stored in the non-searchable copy may undergo initial processing and may be stored in a form that makes it possible to recreate the index files later. Without a search factor of at least one, there may be a significant lag before searching can resume if an indexer goes down. In some embodiments, the cluster master 1020 keeps track of the indexers 1040-1, 1040-2, 1040-3 that have searchable data and ensures that there are always a search factor number of copies of searchable data available.

Figure 2:
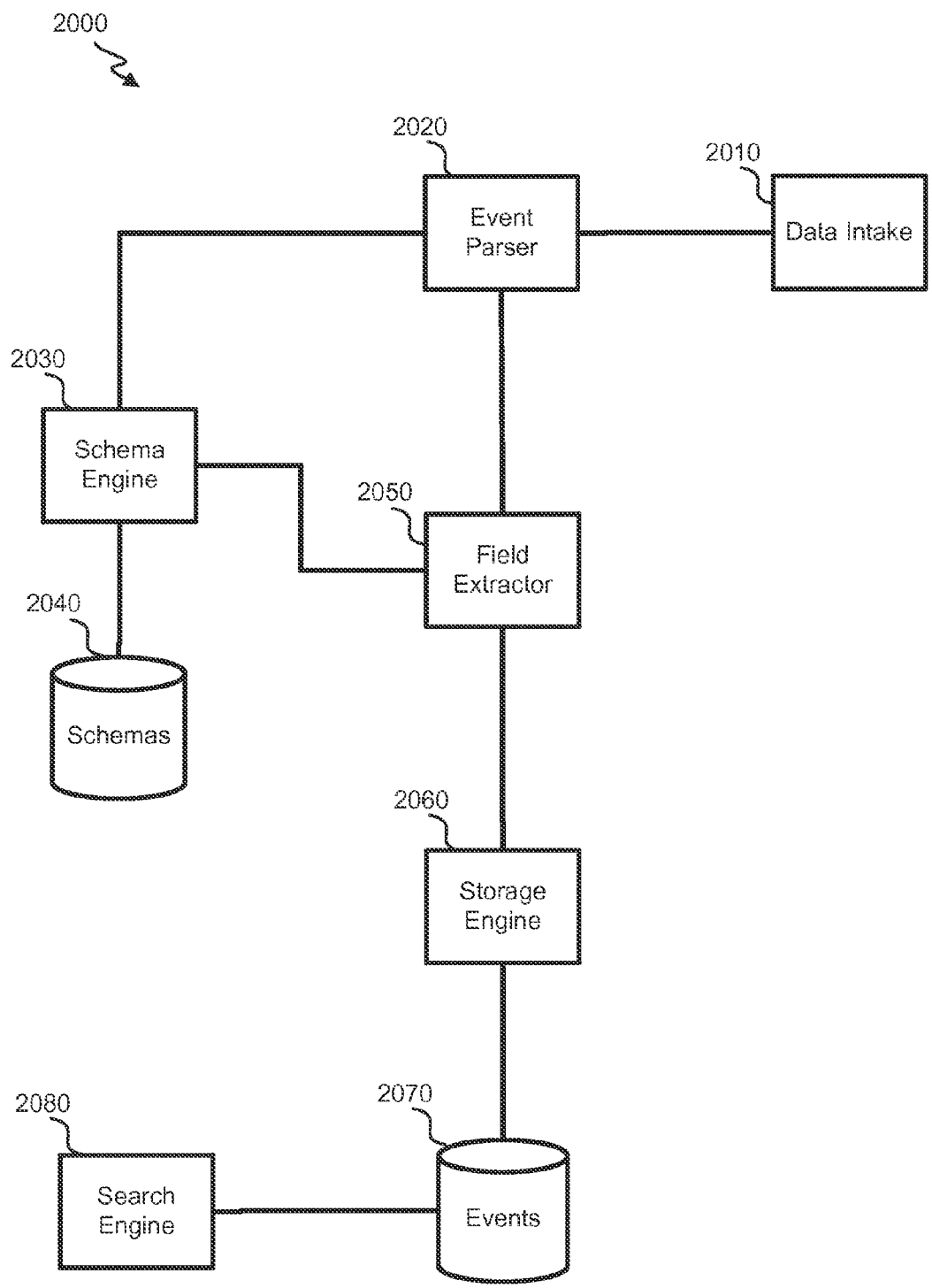
FIG. 2 shows a block diagram of an embodiment of a data management system.

FIG. 2 shows a block diagram of an embodiment of a data management system 2000. In some embodiments, the data management system 2000 may be part of the cluster 1010 illustrated in FIG. 1. In some embodiments, the data management system 2000 may be part of one of the indexers 1040-1, 1040-2, or 1040-3 illustrated in FIG. 1. The data management system 2000 may be used by a service provider to provide a service for storing, indexing, and searching data for one or more clients or customers.

Data intake 2010 receives data, e.g., from a data provider, customer, client, or other user. The data can include automatically collected data, data uploaded by users, or data provided by the data provider directly. In some embodiments, the data may be received from one or more forwarders. In some embodiments, the data includes a structure that allows for individual events and field values within the events to be easily identified. The structure can be predefined and/or identified within the data. For example, various strings or characters can separate and/or identify fields. As another example, field values can be arranged within a multi-dimensional structure, such as a table. In some instances, data partly or completely lacks an explicit structure. For example, in some instances, no structure for the data is present when the data is received and instead is generated later. The data may include a continuous data stream that can include multiple events, each with multiple field values.

A schema engine 2030 identifies an applicable schema that can be used to extract specific field values by imposing structure on data. Specifically, a schema can be "bound" to data by breaking a data stream (e.g., a byte stream) into events and/or extracting field values, such as a time stamp. Schema binding can occur while receiving data, prior to storing data, while storing data, while processing data, while retrieving data, while responding to a search query or some combination of the above (e.g., separating data into events at intake and extracting field values from events while responding to a search query). Late binding schema can be used, which imposes structure on the data at query time rather than at storage or ingestion time.

Schema engine 2030 can itself estimate a schema or can determine a schema based on input from a client, customer, or data provider. The input can include the entire schema or restrictions or identifications that can be used to estimate or determine a full schema. Such input can be received to identify a schema for use either with structured or unstructured data and can be used to reliably extract field values. The schema can be estimated based on patterns in the data (e.g., patterns of characters or breaks in the data or headers or tags identifying various fields in the data, such as <event><message time>2014.01.05.06.59.59</> . . . </>). Schema can be received or estimated in a variety times, including (in some embodiments) any time between receipt or indexing of the data and at query time. The time that the schema is actually received or estimated within the receipt-to-indexing time period may be determined based on a setting or system load. Schema engine 2030 can perform the schema estimation once or multiple times (e.g., continuously or at routine intervals). Once a schema is determined, it can be modified (e.g., periodically, at regular times or intervals, upon receiving modification-requesting input, upon detecting a new or changed pattern in the input, or upon detecting suspicious extracted field values (e.g., being of an inconsistent data type, such as strings instead of previously extracted integers)). In some embodiments, a client, customer, or data provider can provide input indicating a satisfaction with or correction to estimated schema. Received or estimated schemas are stored in a schema data store 2040.

Using the schema, an event parser 2020 can separate the received data into events. For example, event parser 2020 can separate data between particular start and stop tags, or separate data within a table's row, or separate data within particular character numbers in the data. Also using the schema, a field extractor 2050 can extract various field values. In some embodiments, field extractor 2050 further attaches a semantic meaning to the extracted field values (e.g., based on a length and/or character types of the field values). Field extractor 2050 can further convert field values into a particular (e.g., standard or easily searchable) format.

A storage engine 2060 can store data in an event data store 2070. It will be appreciated that event data store 2070 can include multiple data stores or sub-data stores. Event data store 2070 can be stored in working, short-term, and/or long-term memory. In various embodiments, event data store 2070 can include raw data, extracted events, or extracted field values. It will be appreciated that, in some embodiments, part of the data received by data intake 2010 can be deleted or not stored (e.g., field breaks).

Events and/or field values can be stored at locations based on a field value. For example, a field value identifying a message sender may be stored in one of ten data stores, the data store being chosen based on a message time. In some instances, rather than grouping various data components at specific storage areas, event data store 2070 includes an index that tracks identifiers of events and/or fields and identifiers of field values. Thus, for example, the index can include an element for "Data type"="webpage request" (indicating that the element refers to a field value of "webpage request" for the field "data type") and then list identifiers for events with the field value (e.g., "Events 3, 7, 9 and 16"). Selective storage grouping can be referred to as storing data in "buckets." Bucket definitions can be fixed or defined based on input from a data provider, customer, or client. Input and/or automatic rules can be used to add, merge, or delete buckets.

In some instances, a time-series data store is used, such that events and/or field values are stored at locations based on a timestamp extracted from the events. This can allow events with recent timestamps (e.g., which may have a higher likelihood of being accessed) to be stored at preferable memory locations that lend to quicker subsequent retrieval. Further, parallel processing can then be performed, with each process operating on a different time bucket.

A search engine 2080 can subsequently access and search all or part of event data store 2070. The search can be performed upon receiving a search query from a client, user, customer, or other user, or the search can be performed periodically and/or at defined intervals or times. In some embodiments, a search query may be received by the search head 1030 illustrated in FIG. 1, and provided to the search engine 2080. In some embodiments, the search engine 2080 may be part of the search head 1030. Segregation of data into events and/or fields can allow for more efficient searching. The search may include, for example, a request to return all events or identifiers of all events having a value for a field meeting a criterion. To illustrate, search engine 2080 can retrieve all events having a timestamp within a defined time period, or all events having a first field value (e.g., HTTP method) set to a specified value (e.g., GET).

The search may include, for example, a request to return values for one or more first fields for all events having specified values (e.g., specific values or values within a specific range) for one or more second fields. To illustrate, search engine 2080 can retrieve all URLs in events having a timestamp within a defined time period, or all events having a first field value (e.g., HTTP method) set to a specified value (e.g., GET).

In some embodiments, upon retrieving the event data of interest, search engine 2080 may further process the results. The processing may be performed based on an individual value (e.g., to obtain a length or determine if an extracted field value matches a specified value). In some embodiments, processing may be performed across values. For example, the processing may be performed to determine an average, frequency, count, or other statistic. Search engine 2080 can return the search result to the client, customer, or user. For example, the search result may be returned using an interface (such as a web interface or other graphical interface), email, or the like. In some embodiments, the search engine 2080 may include the search head 1030 illustrated in FIG. 1.

Figure 3:
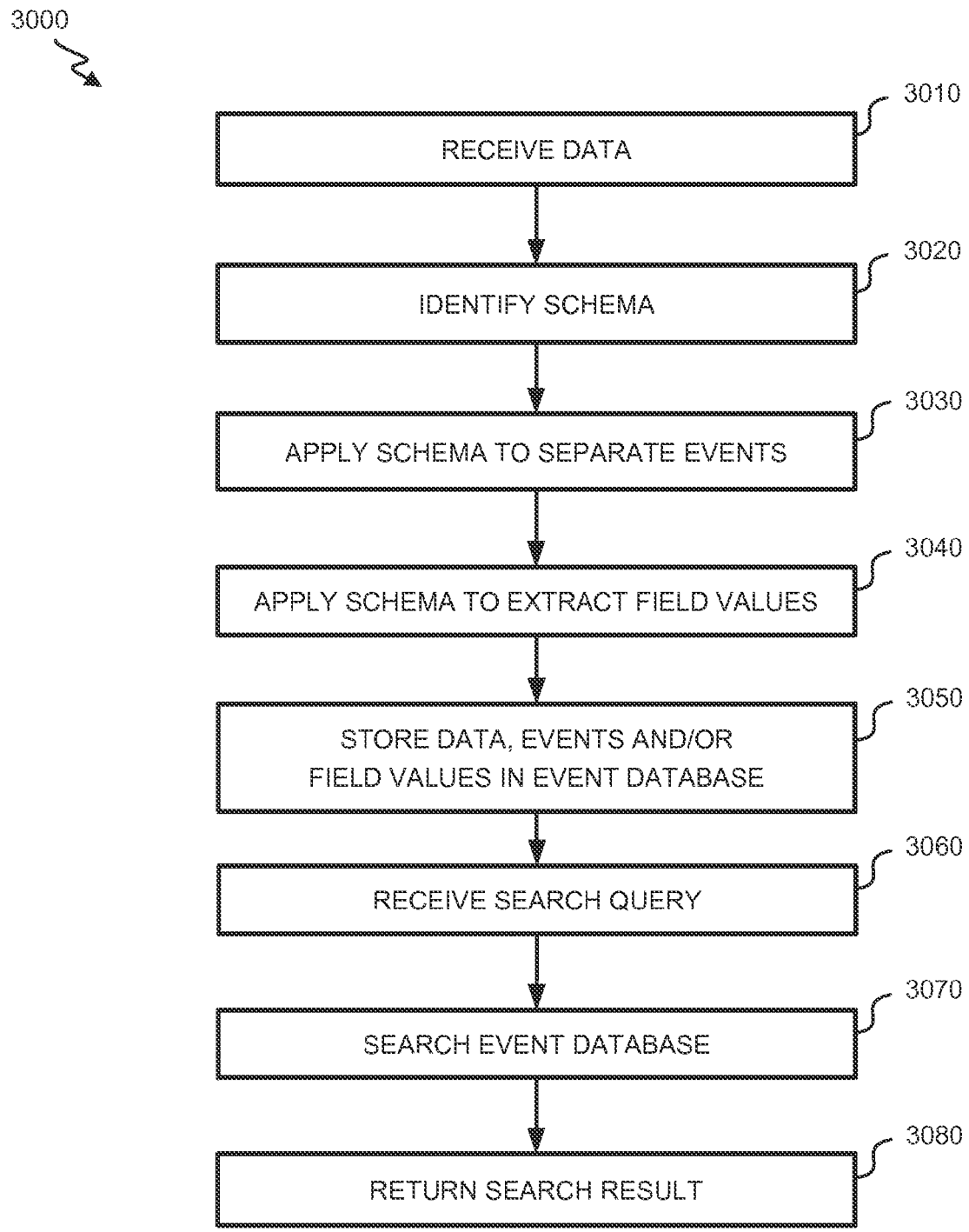
FIG. 3 illustrates a flowchart of an embodiment of a process for storing and using big data.

FIG. 3 illustrates a flowchart of an embodiment of a process 3000 for storing and using big data. Process 3000 begins at block 3010, where data intake 2010 receives data. Schema engine 2030 identifies an applicable schema at block 3020. Event parser 2020 applies the schema to separate the data into events at block 3030. Field extractor 2050 applies the schema to extract field values from the events at block 3040. Storage engine 2060 stores raw data, events and/or field values in event data store 2070 (e.g., by assigning the data, events and/or field values to buckets based on particular field values) at block 3050.

Search engine 2080 receives a search query from a searcher (e.g., client, customer, or user) at block 3060. The search query can include one or more criteria which can specify or constrain field values. Search engine 2080 searches event data store 2070 at block 3070. In some embodiments, the search may entail searching only some of event data store 2070 (e.g., that including field values of interest). The search can produce identifiers of events of interest. Search engine 2080 may then collect other field values for those events of interest. A search result can include the collected other field values and/or a processed version thereof. Search engine 2080 returns the search result to the searcher at block 3080.

It will be appreciated that system 2000 and/or process 3000 may be modified such that schema is not bound to data (or only a portion of the schema is bound to data) immediately following intake. For example, schema could instead be bound to prior to storage of the data, during storage of the data, or at a query time (e.g., subsequent to block 3060 of process 400). Splunk Enterprise produced by Splunk Inc. of San Francisco is an exemplary system for creating a time series data store using a late binding schema. For example, Splunk Enterprise creates a time series data store by segmenting received raw data into events, extracting timestamps from each event, and storing each event in one or more time series data stores that are searchable by timestamp (along with other metadata such as source, type, and the like). Splunk Enterprise allows later schema development of fields any time up to query time.

In some embodiments, data management system 2000 and/or process 3000 may be modified to include features, feature connections, and/or flows as described in Carasso, David. *Exploring Splunk Search Processing Language (SPL) Primer and Cookbook*. New York: CITO Research, 2012 and/or as described in Ledion Bitincka, Archana Ganapathi, Stephen Sorkin, and Steve Zhang. *Optimizing data analysis with a semi-structured time series database*. SLAML, 2010. Each of these references is hereby incorporated by reference in its entirety for all purposes.

In some embodiments, the data received by data intake 2010 include, for example:
- Log data: types of data access attempts, times of data access attempts, users attempting access, access successes, subsequent user behaviors (e.g., subsequently accessed data or access reattempts), error occurrences, warning occurrences, serving resources
- Message data (e.g., email data): sender identifiers, recipient identifiers, transmission times, subject lines, message sizes, message formats, message contents
- Media data: identifiers of movie, picture or sound files; values in files; size of files; entity that uploaded or owns the files; file types; keywords
- Sensor data (e.g., light sensor, motion sensor, accelerometer): sensor identifiers, sensor locations, sensor values
- User activity data (e.g., web-access data): web-page identifiers, user identifiers, locations of users, IP addresses of users, devices used by users via access, sequences of page access, access durations, information entered via web pages
- Social-network data: identifiers of users connected to each other, types of connections, times of connection initiation
- Inventory data: identifiers of products, product prices, inventory remaining, inventory sold, sale locations, sale prices, profits, manufacturer identifiers
- Economic data (e.g., stock data, home-sale data): buyer identifiers, purchase times, identifiers of purchased commodity, seller identifiers, location of purchased commodity (if applicable)
- Employment data: employer identifiers, employee identifiers, employment locations, position types, hire times, termination times, promotion times, promotion types, connections between employees (e.g., between supervisors and supervised employees), salaries
- Medical data (e.g., MRI data, EEG data, medical records): patient identifiers, test identifiers, test data, analysis data
- Genomic data: species identifiers, genes, intra-species reliability, nucleotides, gene identifiers, behavior or disease couplings (e.g., identifying a set of nucleotides being part of gene which is linked to a particular disease)
- Search data: search occurrence, search terms, search constraints, users conducting searches, databases searched, results returned, results selected by (e.g., clicked on) by users
- Call data: phone number and/or user initiating calls, phone number and/or user receiving calls, whether calls were answered, time of call initiations, duration of calls
- Electrical data (e.g., electricity usage): user identifiers, times of usage, amounts of usage, sources of electricity used (e.g., coal, natural gas, nuclear, solar, wind, etc.)
- Neuroscience data (e.g., recordings from neurons): times of recordings, recording values, cell identifiers, amplification settings, users owning recordings As implied from the above examples, data stored and/or used can include a plurality of events (or entries), each of which can include values for particular fields. For example, in the "message data" instance, each event can correspond to a message, and each event can include a value for each of the following fields: sender, recipient, message time, subject, message size, message format, and message content.

Figure 4:
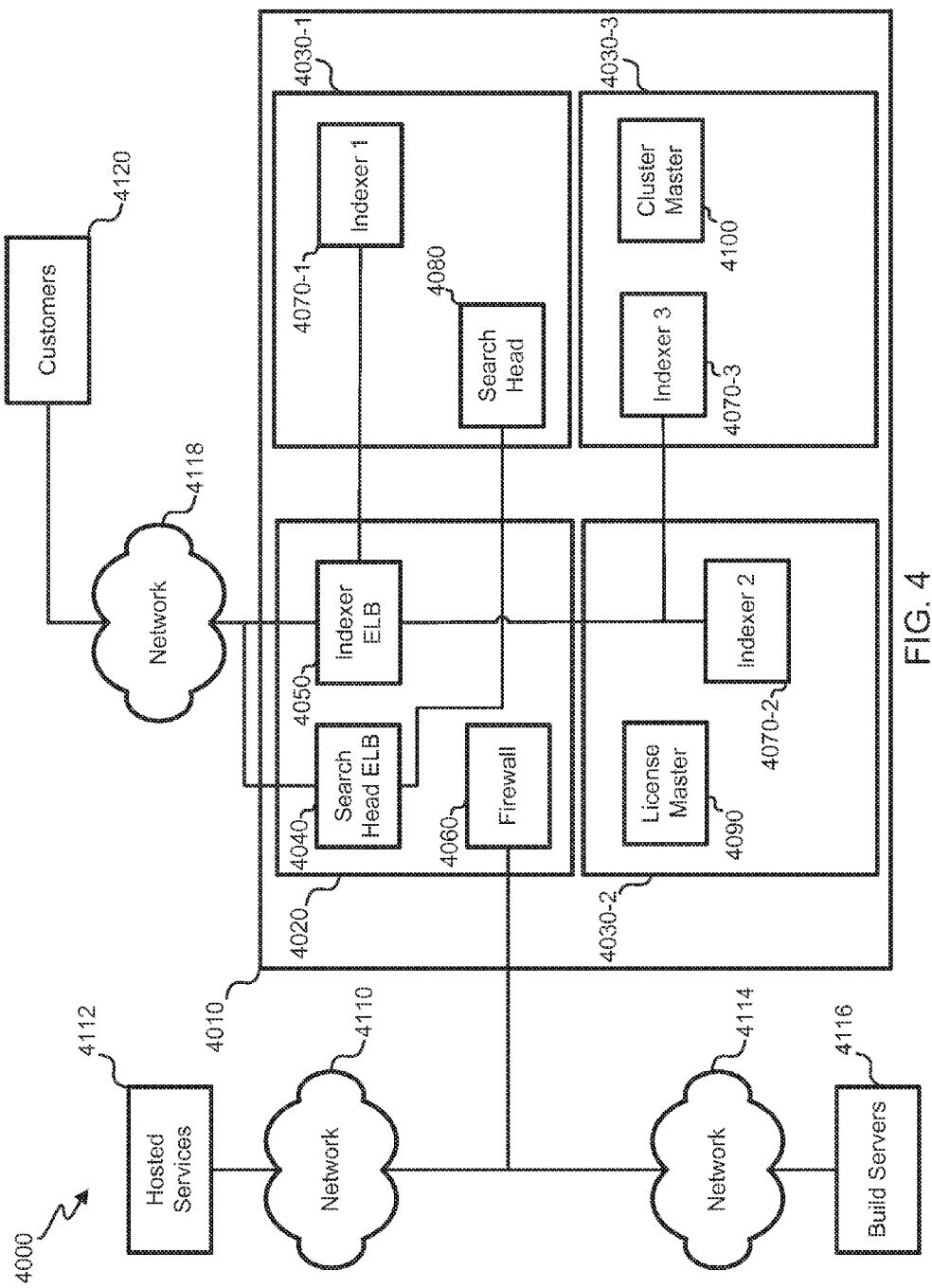
FIG. 4 shows a block diagram of an embodiment of a system implemented in a hosted computing environment.

FIG. 4 shows a block diagram of an embodiment of a system 4000 implemented in a hosted computing environment. In some embodiments, the hosted computing environment includes a cloud computing network. The hosted computing environment allows the network resources to be shared by multiple clients or customers. The resources may be dynamically re-allocated as the demand from different users changes. In some embodiments, the hosted computing environment is a virtual private cloud (VPC). A VPC is a virtual network dedicated to a particular user account and is logically isolated from other virtual networks in the network provider's cloud. Different services may be launched on a VPC. For example, the system 4000 may be implemented on a VPC and may provide a service for collection, analysis, indexing, and secure storage of data into a data store or data source. A client or customer may use the service to store, index, and/or search the customer's data. The client or customer may configure the VPC, including selecting an internet protocol (IP) address range for different components of the network, create subnets, and configure route tables, network gateways, and security settings. In some embodiments, the hosted computing environment is a public cloud network, in which the network is open for public use.

The system 4000 includes a cluster 4010 with public subnet 4020 and private subnets 4030-1, 4030-2, 4030-3. The cluster 4010 may operate similarly to the cluster 1010 illustrated in FIG. 1, and may provide indexing, storing, and searching of data for clients or customers. A subnet is a range of IP addresses in the hosted computing environment that provides a logical grouping of connected network devices. In some embodiments, a public subnet may be used for resources that are to be connected directly to the Internet, and a private subnet may be used for resources that will not be directly connected to the Internet. Service resources may be launched into a selected subnet. A service resource may be referred to as an "instance" after the resource has been launched into a subnet and provided with an IP address in the address range of the subnet. For example, public subnet 4020 includes various instances, such as a search head elastic load balancer (ELB) 4040, an indexer ELB 4050, and a firewall 4060. Each of the instances in the public subnet 4020 includes an external IP address. For example, each of the public subnet 4020 instances may include either an elastic IP address (EIP) or an ELB address.

The private subnets also include various instances that are launched into each subnet. Private subnet 4030-1 includes indexer 1 4070-1 and search head 4080, private subnet 4030-2 includes license master 4090 and indexer 2 4070-2, and private subnet 4030-3 includes cluster master 4100 and indexer 3 4070-3. The cluster master 4100, the search head 4080, and the indexers 4070-1, 4070-2, 4070-3 may perform similar functions as the cluster master 1020, search head 1030, and indexers 1040-1, 1040-2, 1040-3 described above with respect to FIG. 1.

Each of the instances in the private subnets may connect out to the hosted services 4112 (via network 4110) using the firewall 4060 in the public subnet 4020. Further, the instances in the private subnets do not have EIPs. Rather, an ELB may be used to make the private subnet instances available to the Internet. For example, the search head ELB 4040 may be used to provide Internet connectivity to the search head 4080, and the indexer ELB 4050 may be used to provide Internet connectivity to the indexers 4070-1, 4070-2, and 4070-3.

One or more customers 4120 may provide data to be indexed and/or may access the data stored in indexers 4070-1, 4070-2, and 4070-3 via network 4118. The indexers 4070-1, 4070-2, 4070-3 receive and index incoming raw data from clients or customers 4120 via indexer ELB 4050. Based on a replication factor specified by a client or customer, each of the indexers 4070-1, 4070-2, 4070-3 may send replicated data to other indexers 4070-1, 4070-2, 4070-3 in the cluster 4010 and may receive replicated data from other indexers 4070-1, 4070-2, 4070-3. In some embodiments, an indexer 4070-1, 4070-2, or 4070-3 may index received data and simultaneously receive and send replicated data to other indexers. The indexers 4070-1, 4070-2, 4070-3 search across their indexed data in response to search requests received from the search head 4080 via search head ELB 4040. In some embodiments, the indexer ELB 4050 may load balance incoming data equally across each of the indexers 4070-1, 4070-2, and 4070-3. In some embodiments, if any one of the indexers 4070-1, 4070-2, and 4070-3 goes down or is inoperable, the indexer ELB 4050 may not provide any data to that subnet.

The search head 4080 receives search queries, via search head ELB 4040, from clients or customers 4120 requesting a search of client data. The search head 4080 may coordinate and manage searches across the set of indexers 4070-1, 4070-2, 4070-3. The cluster master 4100 informs the search head 4080 of the indexers that are to be used by the search head 4080. The search head 4080 distributes search queries to the indexers 4070-1, 4070-2, 4070-3, and receives search results from each indexer. The search head 4080 may then consolidate the results returned by the indexers, and may return the consolidated results to the client or customer using the search head ELB 4040.

The cluster master 4100 provides management functions for the cluster. For example, the cluster master 4100 coordinates the replicating activities of the indexers 4070-1, 4070-2, 4070-3 based on the specified replication factor. The cluster master 4100 may direct the search head 4080 where to find data among the indexers 4070-1, 4070-2, 4070-3. In some embodiments, the cluster master 4100 manages the configuration of the indexers 4070-1, 4070-2, 4070-3 and orchestrates remedial activities if an indexer 4070-1, 4070-2, 4070-3 goes offline or becomes inoperable. The license master 4090 manages the license for a specific stack within the cluster 4010.

When a client or customer desires to have a service operate on a hosted computing environment, the hosted computing environment must be provisioned so that the various components of the environment are configured for network operation using the service resources. For example, the known service resources that the customer desires to have access to must be mapped to cloud services and components that will run the services. In some embodiments, the service resources include the search head 4080, cluster master 4100, and the indexers 4070-1, 4070-2, 4070-3, which must be mapped to various cloud network components. Build servers 4116 may be used to provision and configure the cluster 4010 to operate the desired service. For example, the build servers 4116 may include a provisioning program, such as a Jenkins or Chef tool. Jenkins and Chef are open source DevOps tools that may be used to configure the services on the hosted computing environment. A server or other machine or virtual machine running an instance of a provisioning program may offer an overview of the build status for projects that were configured to be built on the server or machine.

Commands are provided to the build servers 4116 that describe the service resources that are to be provided and the particular state that the resources should be in. For example, the commands may describe packages that should be installed, services that should be running, and/or files that should be written. Using these commands, the build servers 4116 make sure each resource is properly configured. The commands used to provision the hosted computing environment are complex and require technical knowledge of an underlying programming language. The commands may be included in a provisioning template that specifies the configuration of the hosted computing environment to the build servers 4116. In some embodiments, the provisioning template may be a configuration file. An exemplary provisioning template is illustrated in FIG. 10, and will be discussed in further detail below. Some clients, customers, or other users may not have the technical knowledge relating to the commands that is required to configure the environment. Systems and methods disclosed herein provide these types of clients, customers, and users with the ability to provision a hosted computing environment without requiring them to possess the underlying programming knowledge.

Figure 5:
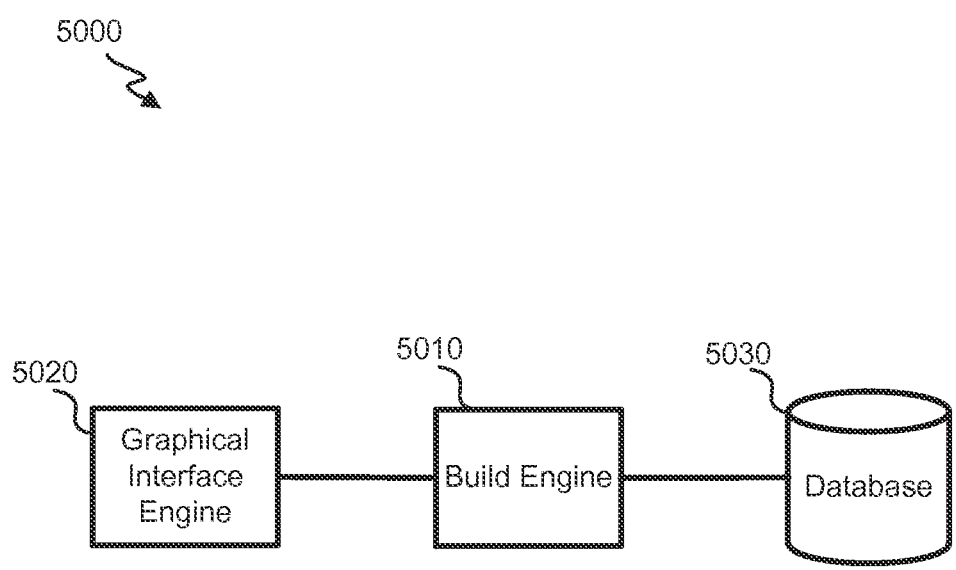
FIG. 5 shows a block diagram of an embodiment of a build system.

FIG. 5 shows a block diagram of an embodiment of a build system 5000 for provisioning and configuring a hosted computing environment, such as the hosted computing environment illustrated in FIG. 4. The build system 5000 includes a graphical interface engine 5020 that generates graphical interfaces that may be used by clients, customers, or other users. Exemplary graphical interfaces will be described below with respect to FIGS. 6 and 7. A client, customer, or other user may indicate one or more requirements for the service implemented on the hosted computing environment by providing one or more inputs into a graphical interface. For example, a user may provide input indicating an amount of storage they wish to have access to in the hosted computing environment. In some embodiments, the user may use a service that stores and/or indexes in the storage a set of event records that include unstructured machine data. The client, customer, or other user may indicate how much storage they need per day. In some embodiments, the client, customer, or user may provide input indicating a client, customer, or user name. In another example, a user may provide input indicating an amount of storage, a customer name, a number of search heads, a number of indexers, a replication factor, and/or a search factor.

The graphical interface engine 5020 receives the input corresponding to the indication of the one or more requirements for the service. The graphical interface engine 5020 may forward the input to the build engine 5010. The build engine 5010 receives the input and converts each indication of the one or more requirements into one or more entries of a provisioning template. The provisioning template includes multiple entries and is associated with the hosted computing environment. The input provided by the user is used by the build engine 5010 to populate the entries of the provisioning template that relate to the input information. For example, an entry in a provisioning template may relate to an amount of storage that a user will have access to per day. In this example, the build engine 5010 may receive input from the user relating to their storage requirements, and may convert the input into the corresponding entry in the provisioning template that relates to the amount of storage. In some embodiments, the conversion of each indication of the requirements into the entries of the provisioning template includes encoding fields entered by the user in the graphical interface into the entries.

Depending on the input provided by the client, customer, or other user, remaining entries of the provisioning template may need to be populated in order to generate a complete provisioning template. For example, in some embodiments, the user may enter enough information into the graphical interface so that a complete provisioning template may be generated. In other embodiments, the user may not enter enough information into the graphical interface to allow a complete provisioning template to be generated.

If the user does not enter enough information into the graphical interface so that a complete provisioning template can be generated, the build engine 5010 determines additional requirements of the hosted computing environment according to the input received from the user. The determined additional requirements may be used to populate the remaining additional entries of the provisioning template. The determined requirements may include an amount of storage, a number of search heads, a number of indexers, a replication factor, a search factor, a license master, or a cluster master. The determination of the requirements may be a rules based determination. For example, the user may input an amount of storage per day that they require of the service that is to be run on the hosted computing environment. In response to receiving the input, the additional requirements determined by the build engine 5010 may include certain configuration requirements of the hosted computing environment that are needed to host the service according the user's required storage amount. For example, the additional requirements may include whether a cluster master or license master is required and/or a specific number of search heads, indexers, or forwarders. As a specific example, a user may input a storage requirement of 50 GB/day. In response, the build engine 5010 may determine, based on a given rule, that the input requirement of 50 GB/day translates into additional requirements of one search head, one indexer, no cluster masters, and a cloud provider instance size of extra large (corresponding to the CPU, memory, storage, and networking capacity of the cloud provider instance).

After the build engine 5010 determines the additional requirements needed to make the service functional in the environment according to the received input, the build engine 5010 populates one or more additional entries of the provisioning template with the determined additional requirements to provide a complete provisioning template.

The build engine 5010 may provide the completed provisioning template to a provisioning program to provision the hosted computing environment. In some embodiments, the provisioning template may be implemented by one or more of the build servers 4116 illustrated in FIG. 4. In some embodiments, the provisioning template may be implemented by the build engine 5010.

The provisioning program may map the provisioning template to one or more components and/or services of the hosted computing environment to provision the components to operate the desired service. By mapping the provisioning template to the components of the hosted computing environment, the components in the hosted computing environment are provisioned so that the components are configured for network operation using the service resources that are described in the provisioning template. The service resources include, for example, one or more search heads, a cluster master, a license master, one or more indexers, a replication factor, and/or a search factor. The entries in the provisioning template corresponding to a resource are mapped to the various hosted computing environment components.

Hosted computing environment component requirements may be determined using information stored in one or more databases, such as database 5030. The databases (e.g., database 5030) may include information about the various hosted computing environment platforms, operating system (e.g., Linux) libraries and tools, functional tests, and performance tests. For example, the database 5030 may include information required to map various virtual machine nodes of the hosted computing environment provider to provider independent node definitions (e.g., an specific network provider node may be mapped to a node with 8 GB of RAM, 4 cores and 840 GB of disk space).

The database 5030 may also include information needed to map objects relating to the provider of the service that are desired by the user (service provider objects) to one or more provider independent nodes or components. The service provider objects may include, for example, a cluster master, license master, a search head, one or more indexers, one or more forwarders, and/or the like. For example, a search head with the capability of 50 concurrent searches maps to a provider independent node with 16 cores and 60 GB of RAM.

Other information that may be stored in the database 5030 may include a list of all dependencies needed to install a service provider role on a given operating system, service provider binaries, an ordering in which the service provider objects need to be brought up (e.g., a cluster master may need to be brought up for service before an indexer), a list of functional tests, and a list of performance tests. The database 5030 may also store information needed to map performance tests to business goals. For example, a first test may test that the system can do 50 concurrent searches, and a second test may test that the system can index 100 GB/day.

The hosted computing environment components may be cloud components that are cloud platform independent. The components in the hosted computing environment may include, for example, physical machines, physical servers, virtual machines, virtual servers, and the like. For example, an entry in the provisioning template may map to a virtual machine with four cores and 8 GB of RAM. For different cloud platforms, the virtual machine may correspond to different types of instances that are specific to that cloud platform provider. If exact matches are not available, most appropriate alternative may be selected.

After the hosted computing environment is provisioned using the provisioning template, the build system 5000 then configures the components of the hosted computing environment by bringing up all of the network components in parallel and configuring the networking, DNS, hostname, and the like. The build system 5000 also creates and maintains a list of dependencies needed to bring up a proper configuration for a given component role. For example a component in a web server role might need php libraries. After all the network components are up, each of the components are configured for a given role in parallel. For example, all libraries and dependencies are fetched from private or public repositories (e.g., database 5030) and installed/deployed on corresponding components.

The build system 5000 then installs all of the software components of the service in the hosted computing environment components. The software components are then configured as indicated by the provisioning template (e.g., with specified index replication, search factor, etc.). The build system 5000 brings up all of the service software components in the proper order to create a cluster (e.g., cluster 4010). For example, a cluster master might be brought up first, followed by a search head and the indexers. In some embodiments, the build system may execute one or more tests to verify the functionality of the cluster system. If all tests pass, the system is declared functional and ready for any performance testing that may be performed.

Accordingly, the system 5000 allows a client, customer, or other user to generate a complete provisioning template while only being required to know high level details about their desired service (e.g., an amount of storage). For example, a user may enter information as simple as an amount of storage needed to index or store their data, and a provisioning template may be generated and used to provision the hosted computing environment to run a service according to their requirements.

Different graphical interfaces and systems may be generated and implemented to accommodate different types of users. For example, users of the provisioning system 5000 may include a business user (e.g., a non-technical sales person), a sales engineer, and/or an engineering/operations professional. Different types of users will have varying sophistication levels with regard to the commands needed to provision the hosted computing environment. Accordingly, each different user may have a different level of engagement with the system and may use a different type of graphical interface.

Figure 6:
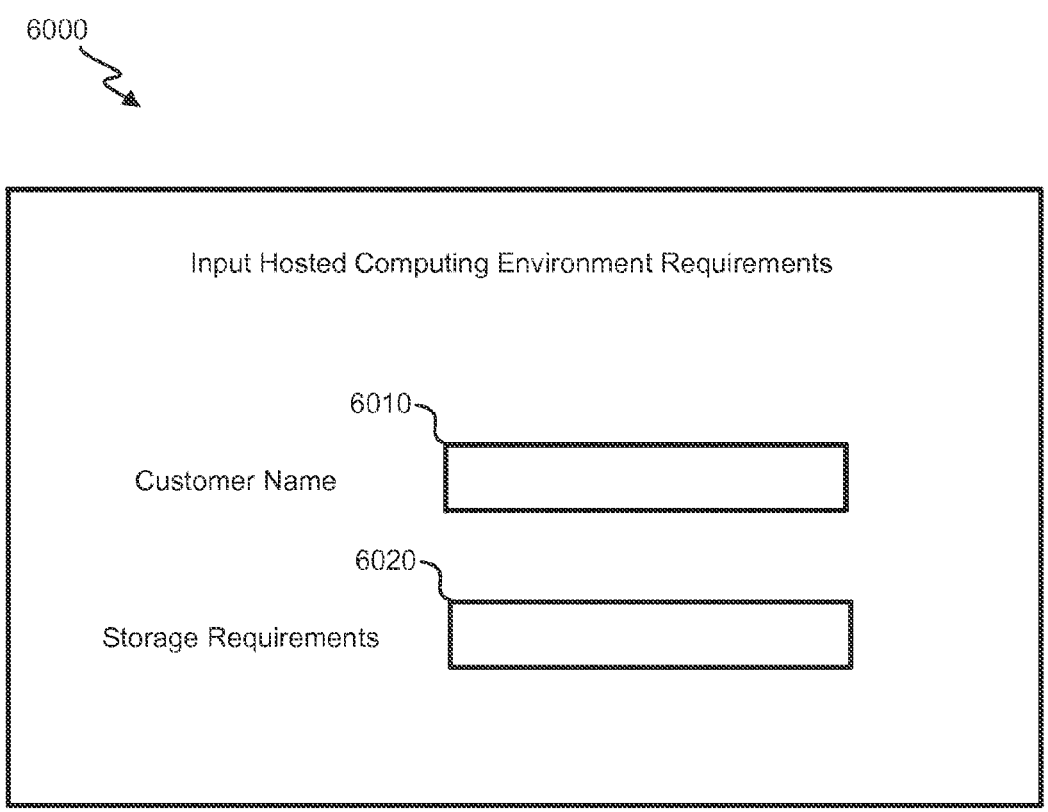
FIG. 6 illustrates an exemplary embodiment of a graphical interface.

FIG. 6 illustrates an exemplary embodiment of a graphical interface 6000. The graphical interface allows a client, customer, or other user to provide an input indicating one or more requirements for a service implemented on the hosted computing environment. The graphical interface 6000 may be designed for use by an unsophisticated user of a service. For example, a business user may not have any knowledge as to the technical details of the service being provided to a customer, such as how many cluster masters, search heads, indexers, and/or forwarders are needed to meet the requirements of the customer. Accordingly, the user may only need to enter the amount of storage that the customer requires for their use of the service. The user may also enter a customer name in order to differentiate the customer from other customers of the service provider.

The user may enter the customer name in input area 6010 and may enter the storage requirements of the customer in input area 6020. Input areas 6010 and 6020 may include any type of input, such as a text input box, a drop-down input, a list of inputs, or the like. The storage requirements entered into input area 6020 indicate an amount of storage the customer requires in the hosted computing environment. In some embodiments, the user may indicate in input area 6020 how much storage they require per day. The graphical interface engine 5020 receives the inputs from graphical interface 6000 and forwards the inputs to the build engine 5010. The build engine then performs the functions described above with respect to FIG. 5 for provisioning and configuring the hosted computing environment.

Figure 7:
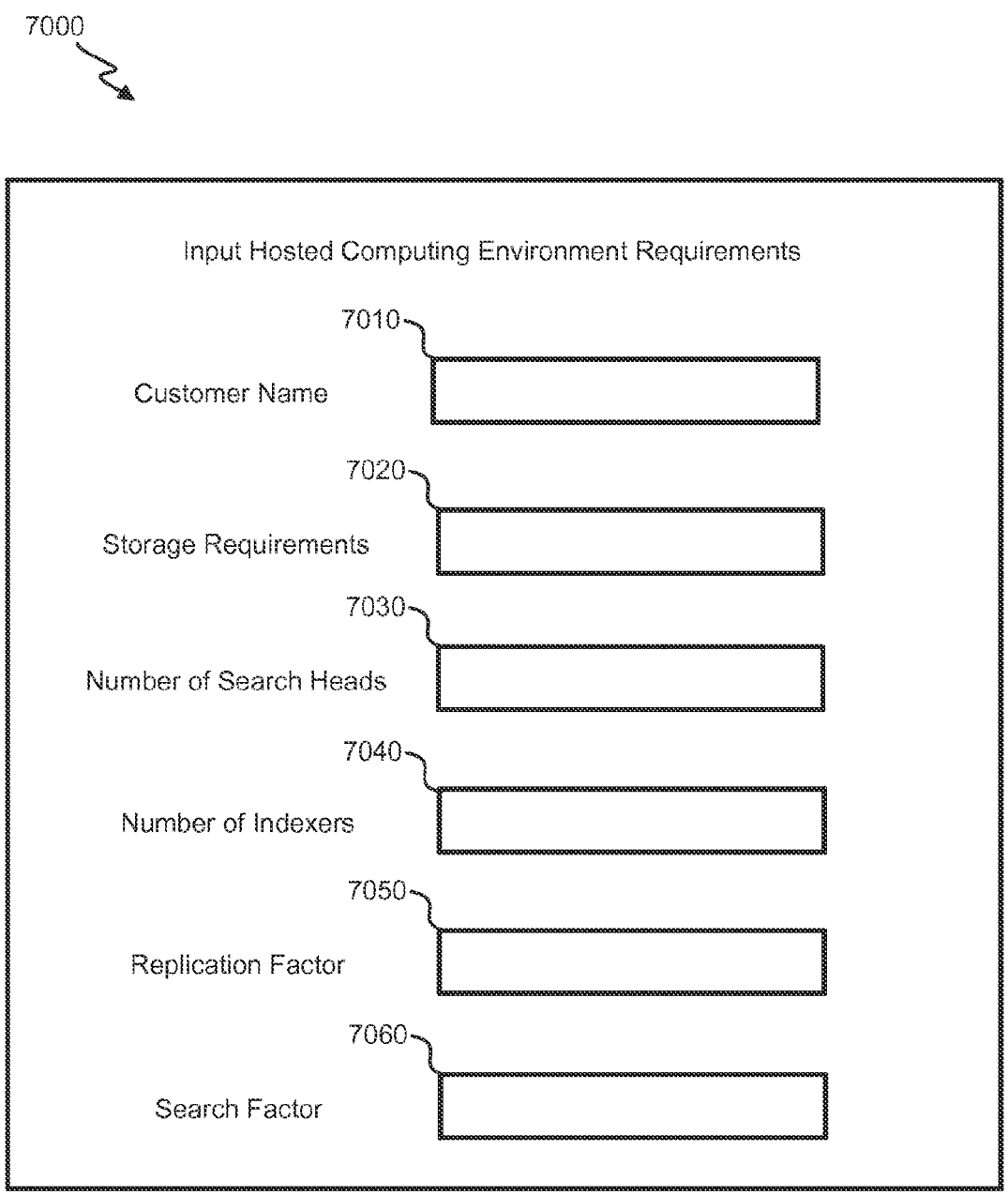
FIG. 7 illustrates another exemplary embodiment of a graphical interface.

FIG. 7 illustrates another exemplary embodiment of a graphical interface 7000. The graphical interface 7000 may be designed for use by a more sophisticated user of a service than a user of graphical interface 6000. For example, a user that knows technical details of the service being offered by the service provider may use graphical interface 7000. If the service relates to those offered by a system similar to that illustrated in FIG. 4, the user may indicate specific requirements of the system needed to implement a customer's needs. For example, using graphical interface 7000, a user may provide input indicating an amount of storage, a customer name, a number of search heads, a number of indexers, a replication factor, and/or a search factor. The user may enter the customer name in input area 7010, the customer storage requirements in input area 7020, a number of search heads in input area 7030, a number of indexers in input area 7040, a replication factor in input area 7050, and a search factor in input area 7060. Input areas 7010-7060 may include any type of input, such as a text input box, a drop-down input, a list of inputs, or the like. The graphical interface engine 5020 receives the inputs from graphical interface 7000 and forwards the inputs to the build engine 5010. The build engine then performs the functions described above with respect to FIG. 5 for provisioning and configuring the hosted computing environment.

In some embodiments, a graphical interface may present a graphical representation of various options that a client, customer, or other user may choose for the configuration of the service on the hosted computing environment. For example, when a user is presented with a graphical interface, a graphical representation may be displayed for the user to visualize the options that may be selected. The user may then select from a list of options presented in the graphical representation displayed in the graphical interface. The options may be pre-selected and generated by the service provider (e.g., an engineer, software developer, and the like) for presentation to the user based on the general architecture of the resulting system and business requirements (e.g., type of service being offered, type of business the customer is involved in, and the like). In some embodiments, the options may include all hosted computing environment services, components, and connections that are available for configuring the network. After a user has selected one or more options, the graphical interface engine 5020 receives the one or more inputs from the graphical interface and forwards the one or more input to the build engine 5010. The build engine then performs the functions described above with respect to FIG. 5 for provisioning and configuring the hosted computing environment.

Some users (e.g., an engineering/operations professional) may know enough about provisioning that they can use a configuration file to provide all inputs to the system. For example, the user may create a provisioning template by writing a JSON configuration file, which may provide all of the necessary inputs to configure the hosted computing environment. For example, an experienced user may use a configuration file to provide the following inputs to create a provisioning template:

Compute

The compute section establishes instances in the hosted computing environment. The values below are placed in an array. The following values are supported for each array element under the compute label:

| Value | Default | Description |
| --- | --- | --- |
| hostname | | Identifier for the provisioned instance (alphanumeric and underscores, unique per stack) |
| instance_type | m1.small | Size of instance (e.g., in Amazon style as m1.large) |
| role | | Top-level run-list entry defining instance configuration |

-continued

| Value | Default | Description |
| --- | --- | --- |
| cluster_id | Numeric identifier of cluster membership | |
| dnsalias_int | none | Array of DNS alias names for host-discovery by other nodes |
| dnsalias_pub | none | Array of DNS aliases for public access (beyond stack) |
| reprovision | allow | Protection against automatic instance destruction: allow, never |
| security_groups | TBD | Array of network security-group names |
| storage | none | Array of block-storage definitions |
| Tags | Stack, Role | List of tags (key = val) to apply at cloud-provider level |
| zone | 1 | Availability zone (index into the regions JSON object, see below) |

Storage
Storage attachments can be defined with the following settings:

| Value | Default | Description |
| --- | --- | --- |
| size | 10 | Gigabytes to allocate |
| element | | Element number within a device |
| device | | Name of device to which this element belongs |
| iops | 2000 | Performance requested (non-sequential I/O operations per second) |
| tags | none | Key/value pairs |
| volumetype | standard | Storage type -- ephemeral, standard, iol, ssd |
| zone | (instance zone) | Availability zone, from regions definitions |

Security Groups
Security groups are defined as follows:

| Keyword | Value |
| --- | --- |
| name | Group name |
| description | Text description |
| rules | Array of rules, as below |
| Security Rules | |
| ip_protocol | icmp, tcp or udp |
| direction | inbound (outbound isn't supported) |
| range | port number number or range 0 through 65535 |
| source | IPv4 address block, in CIDR notation n.n.n.n.n/m |
| group | name of another security group |

Availability Zones
Availability zones are defined as a separate JSON object:

| Value | Default | Description |
| --- | --- | --- |
| ami | TBD | Default base image |
| region | | Region, e.g. us-east-1 or us-west-1 |
| zone | | Zone identifier, e.g. us-east-1c |

Figure 8:
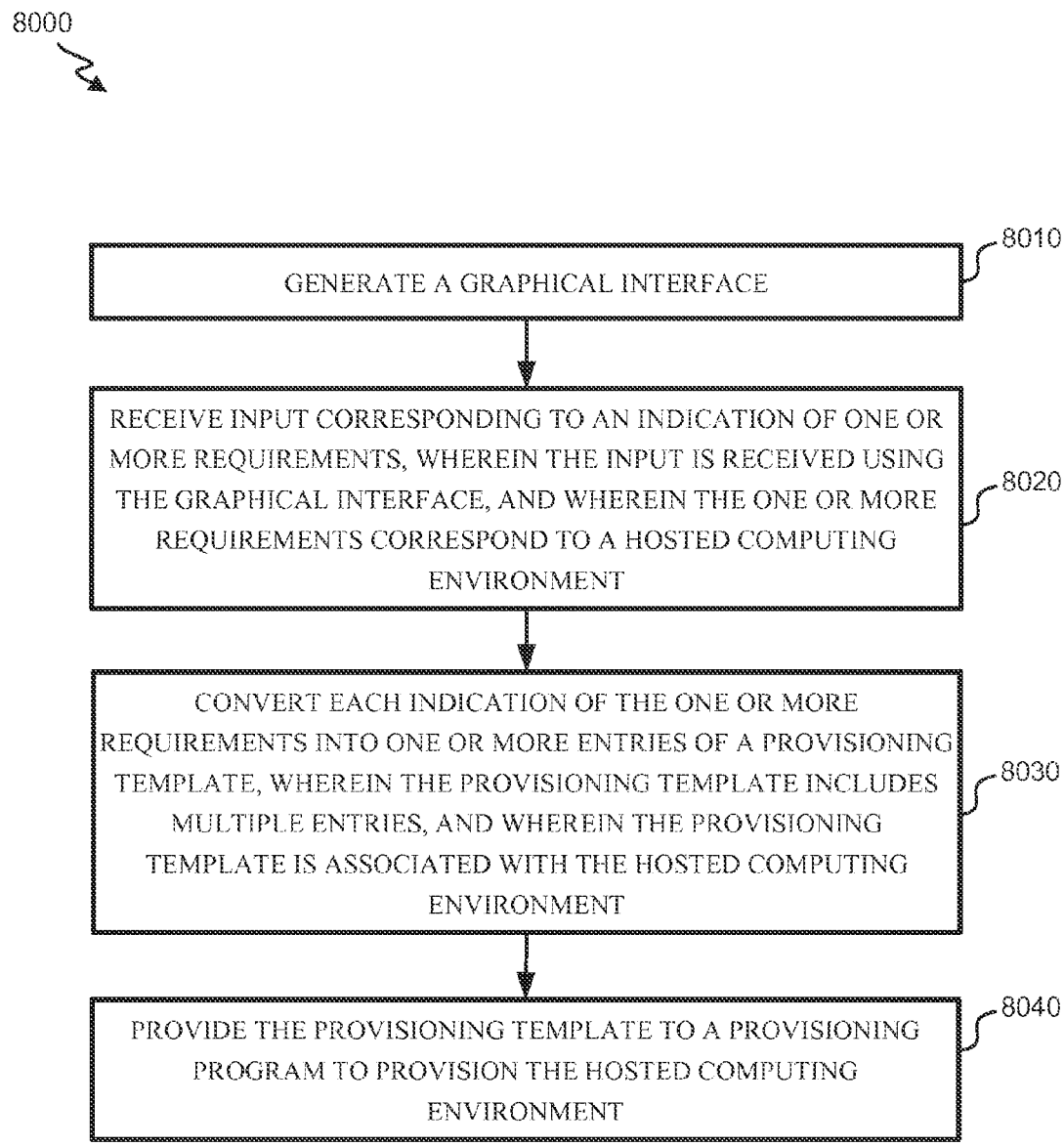
FIG. 8 illustrates a flowchart of an embodiment of a process for provisioning a hosted computing environment with services.

FIG. 8 illustrates a flowchart of an embodiment of a process 8000 for provisioning a hosted computing environment with services. In some embodiments, process 8000 may be implemented by build system 5000 in order to provision and configure the hosted computing environment illustrated in FIG. 4. Process 8000 begins at block 8010 by generating a graphical interface on a computing device. For example, the graphical interface engine 5020 may generate the graphical interface.

At block 8020, the process 8000 continues by receiving input corresponding to an indication of one or more requirements, wherein the input is received using the graphical interface, and wherein the one or more requirements correspond to a hosted computing environment. In some embodiments, the indication of the one or more requirements includes an amount of storage. In some embodiments, the indication of the one or more requirements includes an amount of storage per day. The storage may be a time series data store used for storing a set of event records that include unstructured machine data. The time series data store may store data that is segmented into a set of timestamped events. In some embodiments, the indication of the one or more requirements further includes a customer name. For example, a user may use graphical interface 6000 to input customer storage requirements and customer name. In some embodiments, the indication of the one or more requirements includes an amount of storage, a customer name, a number of search heads, a number of indexers, a replication factor, or a search factor. For example, a user may use graphical interface 7000 to input one or more of the various customer requirements.

The process 8000 continues at block 8030 by converting each indication of the one or more requirements into one or more entries of a provisioning template, wherein the provisioning template includes multiple entries, and wherein the provisioning template is associated with the hosted computing environment. The provisioning template defines a configuration of the hosted computing environment. For example, the build engine 5010 may convert inputs received from the graphical interface engine 5020 into one or more entries of the provisioning template. In some embodiments, the user may enter enough information into the graphical interface so that a complete provisioning template may be generated.

If a complete provisioning template can be generated based on the received input, the process 8000 continues to block 8040 and provides the provisioning template to a provisioning program to provision the hosted computing environment. In some embodiments, the provisioning program includes an open source provisioning program. For example, the provisioning program may include a Jenkins or a Chef tool, as described above.

Figure 9:
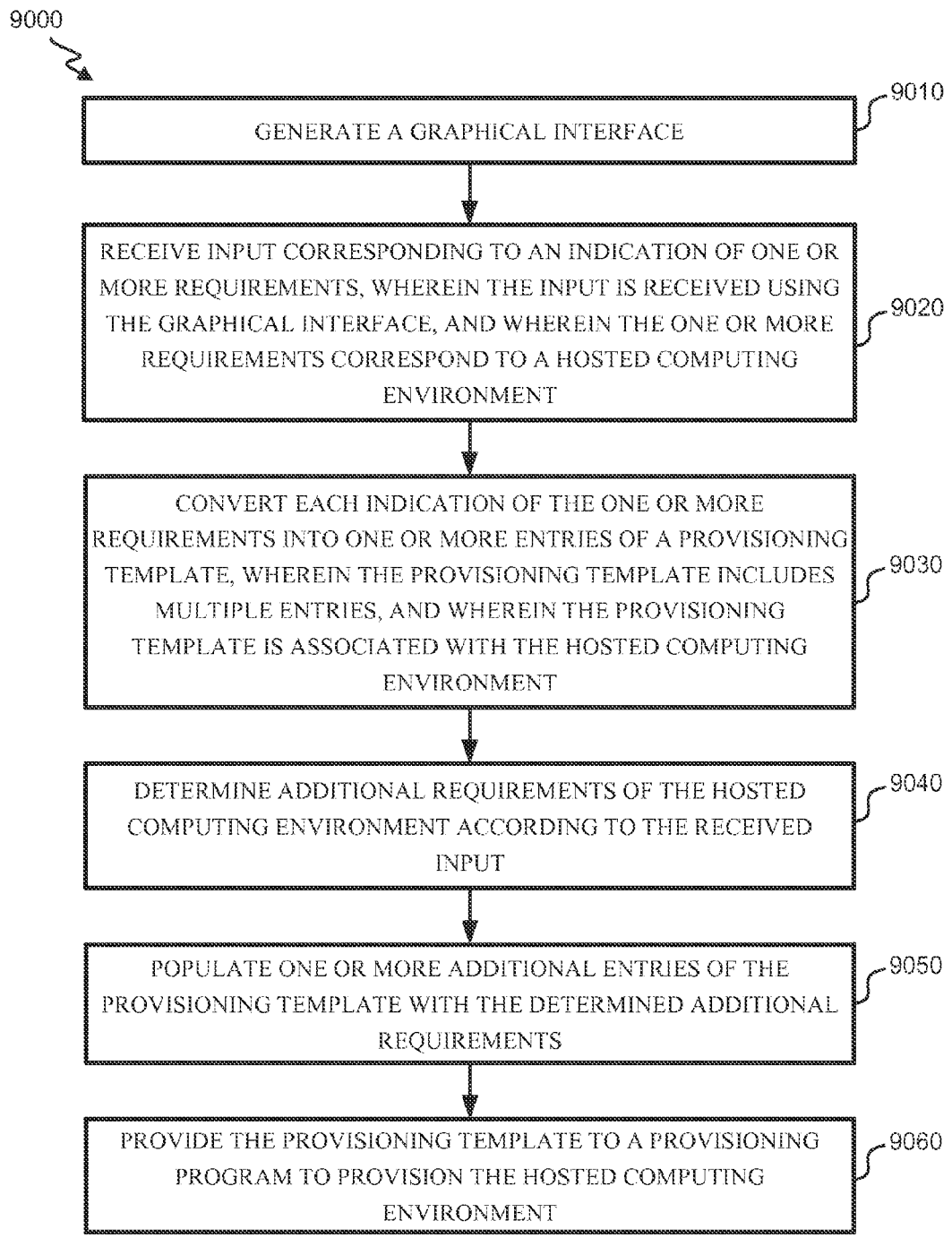
FIG. 9 illustrates a flowchart of another embodiment of a process for provisioning a hosted computing environment with services.

FIG. 9 illustrates a flowchart of another embodiment of a process 9000 for provisioning a hosted computing environment with services. In some embodiments, process 9000 may be implemented by build system 5000 in order to provision and configure the hosted computing environment illustrated in FIG. 4. Process 9000 may be implemented when a user does not enter enough information in the graphical interface so that a complete provisioning template may be generated.

Process 9000 begins at block 9010 by generating a graphical interface on a computing device. The graphical interface engine 5020 may generate the graphical interface.

At block 9000, the process 9000 continues by receiving input corresponding to an indication of one or more requirements, wherein the input is received using the graphical interface, and wherein the one or more requirements correspond to a hosted computing environment. In some embodiments, the indication of the one or more requirements includes an amount of storage. The indication of the amount of storage may include an amount of storage per day. The indication of the one or more requirements may further include a customer name. For example, a user may use graphical interface 6000 to input customer storage requirements and customer name. In some embodiments, the indication of the one or more requirements includes an amount of storage, a customer name, a number of search heads, a number of indexers, a replication factor, or a search factor. For example, a user may use graphical interface 7000 to input one or more of the various customer requirements.

The process 9000 continues at block 9030 by converting each indication of the one or more requirements into one or more entries of a provisioning template, wherein the provisioning template includes multiple entries, and wherein the provisioning template is associated with the hosted computing environment. The provisioning template defines a configuration of the hosted computing environment. For example, the build engine 5010 may convert inputs received from the graphical interface engine 5020 into one or more entries of the provisioning template.

In some embodiments, the user may not enter enough information into the graphical interface to allow a complete provisioning template to be generated. As a result, the process 9000 continues at block 9040 by determining additional requirements of the hosted computing environment according to the input received using the graphical interface. For example, the build engine 5010 may determine the additional requirements based on the received input. The determined additional requirements may be used to populate the remaining additional entries of the provisioning template. The determined requirements may include an amount of storage, a number of search heads, a number of indexers, a replication factor, a search factor, a license master, and/or a cluster master. In some embodiments, the determination of the additional requirements may be a rules based determination, as described above with respect to FIG. 5. For example, the input indicating one or more requirements includes an amount of storage, and the additional requirements include a number of search heads, a number of indexers, a replication factor, a search factor, or a cluster master based on a rule for the indicated amount of storage.

At block 9050, the process 9000 continues by populating one or more additional entries of the provisioning template with the determined additional requirements. For example, the build engine 5010 may populate one or more additional entries of the provisioning template with the determined additional requirements to provide a complete provisioning template. In some embodiments, any other remaining entries of the provisioning template may be populated based on rules (e.g., retention policies, security, and the like).

The process 9000 continues to block 9060 and provides the provisioning template to a provisioning program to provision the hosted computing environment. The provisioning program may include an open source provisioning program, such as a Jenkins or a Chef tool.

In some embodiments, the process 8000 and/or 9000 may further include mapping the provisioning template to one or more components of the hosted computing environment. For example, the provisioning program may map the provisioning template to one or more components and/or services of the hosted computing environment to provision the components to operate the desired service. As a result, the components in the hosted computing environment are provisioned so that the components are configured for network operation using the service resources that are described in the provisioning template. In some embodiments, the build engine 5010 may determine hosted computing environment component requirements according to the received input using information stored in one or more databases, such as database 5030. Further details relating to mapping of the provisioning template to one or more components of the hosted computing environment are described above with respect to FIG. 5.

In some embodiments, the process 8000 and/or 9000 may further include configuring each of the one or more components of the hosted computing environment based on the mapping of the provisioning template, wherein each of the one or more components are configured in parallel. Process 8000 and/or 9000 may further include creating a cluster by installing software components on the configured components of the hosted computing environment. In some embodiments, the cluster includes a search head, one or more indexers, a cluster master, and/or a license master. For example, the cluster may correspond to the cluster 4000 illustrated in FIG. 4. Further details relating to configuring the components of the hosted computing environment and installation of software components on the configured components to create a cluster are described above with respect to FIG. 5.

FIG. 10 shows an exemplary embodiment of a provisioning template 10000. In some embodiments, the provisioning template 10000 includes a JSON file or any other type of configuration file. The provisioning template 10000 may be generated based on one or more requirements that a user specifies using a graphical interface. For example, the user may specify that a service provided by a service provider must be able to handle a certain amount of storage and indexing of a customer's data per day. The provisioning template 10000 may specify a configuration of a hosted computing environment that is required based on the customer requirements. One or more build servers running a provisioning program may use the provisioning template 10000 to provision and configure the hosted computing environment.

The provisioning template 10000 includes multiple entries that include various environment attributes. Environment attributes included in the provisioning template 10000 include:

Stack ID
Domain
Repo Hostname
Zabbix Hostname(s)
SSH keypair name
Cloud vendor name/account
DNS vendor name/account
AWS type (default unless overridden in the provisioner)
License Server
    Name of license-key databag (default: license_<stackid>)
    Domain Name Server (DNS) name of Licenser load balancer
    DNS name of primary License Master
    DNS name of standby License Master
Search Head
    DNS name of Search Head load balancer
    DNS name of primary Search Head
    DNS name of standby Search Head distributedSearch and replicationSettings parameters
(for distsearch.conf)
Indexer
    Port number to listen on for incoming S2S data (default to 9997)
    Port number to listen for replicated data (default to 9887)
    Port number for management port (default to 8089)
    List of Clusters
        Cluster number
        DNS name of Cluster Master
        Replication factor
        Search factor
            List of indexer peers
    List of Index configurations
        Index Name
        Retention Policy
        Other arbitrary index configuration key/values Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, architecture provider or reviewer, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
    generating a graphical interface on a computing device;
    receiving input corresponding to one or more requirements, wherein the input is received using the graphical interface, and wherein the one or more requirements relate to a service in a cloud-based computing environment;
    maintaining a rule specifying how to convert the one or more requirements into one or more entries of a provisioning template;
    converting the one or more requirements into the one or more entries of the provisioning template using the rule, wherein the one or more entries include an indication of hardware or a virtual machine environment configured to meet the one or more requirements, and wherein the one or more entries are in a format for instructing a provisioning program how to provision the cloud-based computing environment; and
    providing the provisioning template to a provisioning program as a configuration command file to provision the cloud-based computing environment.

2. The method of claim 1, wherein the rule is user-configurable.

3. The method of claim 1, wherein the provisioning program includes a Chef configuration management tool that uses the provisioning template to instruct a cloud-based platform how to provision the cloud-based computing environment.

4. The method of claim 1, wherein the provisioning program includes a configuration management tool.

5. The method of claim 1, wherein the provisioning program includes a configuration management tool that uses the provisioning template to instruct a cloud-based platform how to provision the cloud-based computing environment.

6. The method of claim 1, wherein the entries of the provisioning template include both an indication of hardware and a virtual machine environment configured to meet the one or more requirements.

7. The method of claim 1, wherein the entries of the provisioning template include an indication of hardware configured to meet the one or more requirements, an indication of a virtual machine environment configured to meet the one or more requirements, and an indication of software configured to meet the one or more requirements.

8. The method of claim 1, wherein the provisioning program includes a Jenkins continuous integration tool.

9. The method of claim 1, wherein the provisioning program includes a continuous integration tool.

10. The method of claim 1, wherein the service to which the one or more requirements relate includes indexing, searching, retrieval, or storage of data in the cloud-based computing environment.

11. The method of claim 1, wherein the service to which the one or more requirements relate includes a storage of data derived from machine data.

12. The method of claim 1, wherein the service to which the one or more requirements relate includes a storage of events derived from machine data.

13. A system, comprising:
    one or more data processors; and
    a non-transitory computer-readable storage medium coupled to the one or more processors containing instructions which when executed on the one or more data processors, cause the one or more processors to perform operations including:
    generating a graphical interface on a computing device;
    receiving input corresponding to one or more requirements, wherein the input is received using the graphical interface, and wherein the one or more requirements relate to a service in a cloud-based computing environment;
    maintaining a rule specifying how to convert the one or more requirements into one or more entries of a provisioning template;
    converting the one or more requirements into the one or more entries of the provisioning template using the rule, wherein the one or more entries include an indication of hardware or a virtual machine environment configured to meet the one or more requirements, and wherein the one or more entries are in a format for instructing a provisioning program how to provision the cloud-based computing environment; and
    providing the provisioning template to a provisioning program as a configuration command file to provision the cloud-based computing environment.

14. The system of claim 13, wherein the rule is user-configurable.

15. The system of claim 13, wherein the provisioning program includes a configuration management tool that uses the provisioning template to instruct a cloud-based platform how to provision the cloud-based computing environment.

16. The system of claim 13, wherein the entries of the provisioning template include both an indication of hardware and a virtual machine environment configured to meet the one or more requirements.

17. The system of claim 13, wherein the entries of the provisioning template include an indication of hardware configured to meet the one or more requirements, an indication of a virtual machine environment configured to meet the one or more requirements, and an indication of software configured to meet the one or more requirements.

18. The system of claim 13, wherein the graphical interface interfaces with a continuous integration tool.

19. The system of claim 13, wherein the service to which the one or more requirements relate includes indexing, searching, retrieval, or storage of data in the cloud-based computing environment.

20. The system of claim 13, wherein the service to which the one or more requirements relate includes a storage of data derived from machine data.

21. A computer-program product tangibly embodied in a non-transitory machine-readable storage medium, including instructions configured to cause one or more data processors to:
  generate a graphical interface on a computing device;
  receive input corresponding to one or more requirements, wherein the input is received using the graphical interface, and wherein the one or more requirements relate to a service in a cloud-based computing environment;
  maintain a rule specifying how to convert the one or more requirements into one or more entries of a provisioning template;
  convert the one or more requirements into the one or more entries of the provisioning template using the rule, wherein the one or more entries include an indication of hardware or a virtual machine environment configured to meet the one or more requirements, and wherein the one or more entries are in a format for instructing a provisioning program how to provision the cloud-based computing environment; and
  provide the provisioning template to a provisioning program as a configuration command file to provision the cloud-based computing environment.

22. The computer-program product of claim 21, wherein the rule is user-configurable.

23. The computer-program product of claim 21, wherein the provisioning program includes a configuration management tool that uses the provisioning template to instruct a cloud-based platform how to provision the cloud-based computing environment.

24. The computer-program product of claim 21, wherein the entries of the provisioning template include both an indication of hardware and a virtual machine environment configured to meet the one or more requirements.

25. The computer-program product of claim 21, wherein the entries of the provisioning template include an indication of hardware configured to meet the one or more requirements, an indication of a virtual machine environment configured to meet the one or more requirements, and an indication of software configured to meet the one or more requirements.

26. The computer-program product of claim 21, wherein the graphical interface interfaces with a Jenkins continuous integration tool.

27. The computer-program product of claim 21, wherein the graphical interface interfaces with a continuous integration tool.

28. The computer-program product of claim 21, wherein the service to which the one or more requirements relate includes indexing, searching, retrieval, or storage of data in the cloud-based computing environment.

29. The computer-program product of claim 21, wherein the service to which the one or more requirements relate includes a storage of data derived from machine data.

30. The computer-program product of claim 21, wherein the service to which the one or more requirements relate includes a storage of events derived from machine data.

* * * * *